(12) United States Patent
Le Hong

(10) Patent No.: US 9,828,861 B2
(45) Date of Patent: Nov. 28, 2017

(54) TURBINE ENGINE BLADE MADE OF COMPOSITE MATERIAL WITH A BULB-SHAPED ROOT

(71) Applicants: SNECMA, Paris (FR); HERAKLES, Le Haillan (FR)

(72) Inventor: Son Le Hong, Thomery (FR)

(73) Assignees: SNECMA, Paris (FR); HERAKLES (SPS), Le Haillan (FR)

( * ) Notice: Subject to any disclaimer, the term of this patent is extended or adjusted under 35 U.S.C. 154(b) by 296 days.

(21) Appl. No.: 14/428,706

(22) PCT Filed: Sep. 17, 2013

(86) PCT No.: PCT/FR2013/052123
§ 371 (c)(1),
(2) Date: Mar. 17, 2015

(87) PCT Pub. No.: WO2014/049225
PCT Pub. Date: Apr. 3, 2014

(65) Prior Publication Data
US 2015/0247412 A1 Sep. 3, 2015

(30) Foreign Application Priority Data
Sep. 26, 2012 (FR) ...................... 12 59014

(51) Int. Cl.
*F01D 5/28* (2006.01)
*F01D 5/30* (2006.01)
(Continued)

(52) U.S. Cl.
CPC ............ *F01D 5/282* (2013.01); *F01D 5/147* (2013.01); *F01D 5/3038* (2013.01);
(Continued)

(58) Field of Classification Search
CPC ....... F01D 5/282; F01D 5/3084; F01D 5/3015
See application file for complete search history.

(56) References Cited

U.S. PATENT DOCUMENTS 2,950,083 A * 8/1960 Compton ................ F01D 5/282
156/180
4,802,824 A 2/1989 Gastebois et al.
(Continued)

FOREIGN PATENT DOCUMENTS

EP 2469031 A2 6/2012
FR 2608674 A1 6/1988

OTHER PUBLICATIONS

International Search Report dated Dec. 5, 2013 in PCT/FR2013/052123 filed Sep. 17, 2013.

*Primary Examiner* — Justin Seabe
(74) *Attorney, Agent, or Firm* — Oblon, McClelland, Maier & Neustadt, L.L.P.

(57) ABSTRACT

A turbine engine blade made of composite material including fiber reinforcement obtained by three dimensionally weaving yarns and densified with a matrix, the blade including an airfoil and a blade root forming a single part. The blade root includes two opposite lateral flanks that are substantially plane and that are clamped between two independent pads made of composite material, which pads are fastened against the lateral flanks of the blade root to form a blade root that is bulb-shaped.

9 Claims, 1 Drawing Sheet

(51) Int. Cl.
*F01D 11/00* (2006.01)
*F01D 5/14* (2006.01)

(52) U.S. Cl.
CPC .......... *F01D 5/3084* (2013.01); *F01D 11/008* (2013.01); *F05D 2220/30* (2013.01); *F05D 2230/30* (2013.01); *F05D 2230/60* (2013.01); *F05D 2240/24* (2013.01); *F05D 2300/20* (2013.01); *F05D 2300/2261* (2013.01); *F05D 2300/437* (2013.01); *F05D 2300/6033* (2013.01); *Y02T 50/672* (2013.01); *Y02T 50/673* (2013.01)

(56) References Cited

U.S. PATENT DOCUMENTS

| | | | |
|---|---|---|---|
| 8,231,354 B2* | 7/2012 | Campbell | B23P 15/04 416/193 A |
| 2010/0189562 A1* | 7/2010 | Blanchard | B29D 99/0025 416/219 R |
| 2012/0163986 A1 | 6/2012 | Darkins, Jr. et al. | |

* cited by examiner

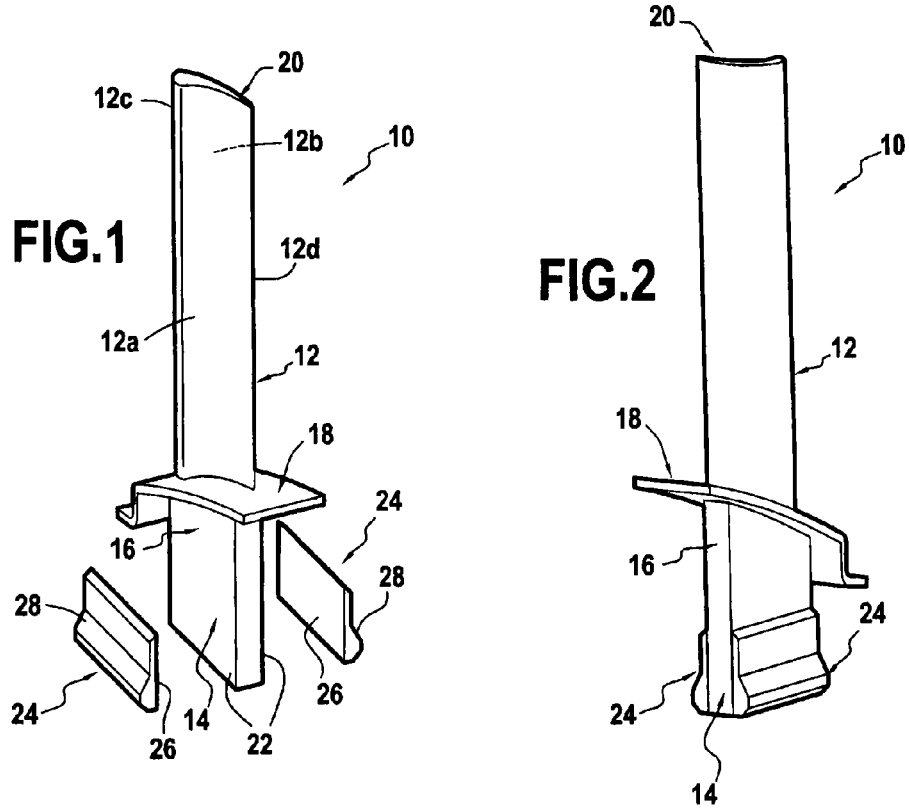
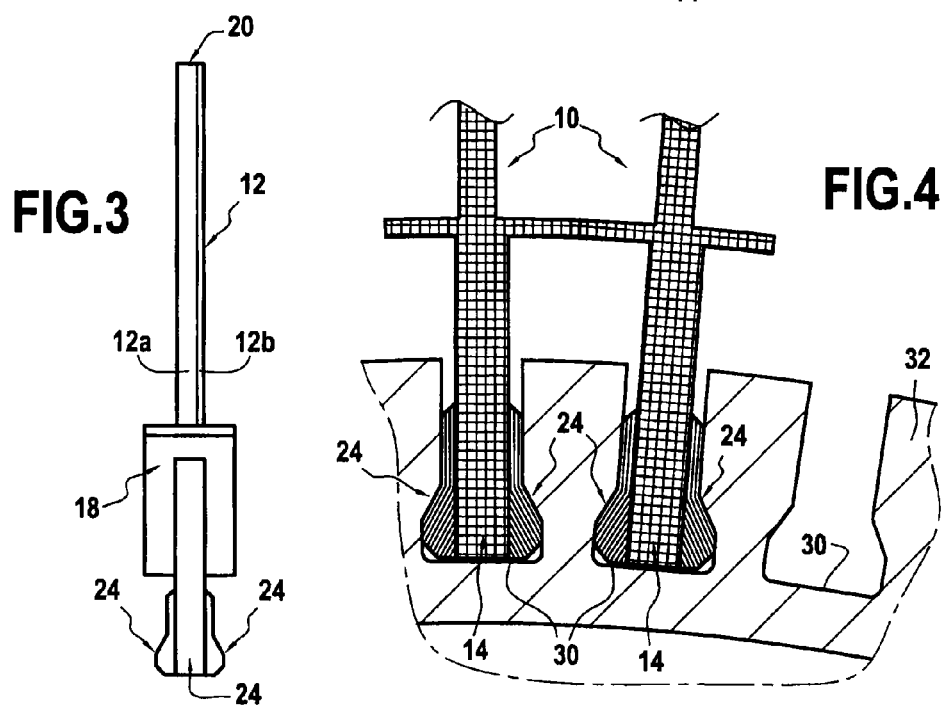

TURBINE ENGINE BLADE MADE OF COMPOSITE MATERIAL WITH A BULB-SHAPED ROOT

BACKGROUND OF THE INVENTION

The present invention relates to the general field of turbine engine blades made of composite material and having a root in the form of a bulb for mounting on a rotor disk via a dovetail type connection.

The intended field is that of gas turbine blades for aeroengines or for industrial turbines.

Proposals have already been made to make turbine engine blades out of composite material. By way of example, reference may be made to International patent application number WO 2010/061140 filed jointly in the names of Snecma and Snecma Propulsion Solide, which describes fabricating a turbine engine blade by making a fiber preform by three-dimensional weaving and by densifying the preform with a matrix.

Furthermore, for mounting such a blade on a rotor disk, it is known to give the blade root the shape of a bulb. The blade root with its bulb shape co-operates with a slot of complementary shape formed in the periphery of the rotor disk in order to retain the blade radially on the disk by a dovetail type connection.

With a blade made of composite material, the bulb shape of the blade root is generally made during weaving of the fiber blank that is that constitute the blade by forming extra thickness in the blade root, this extra thickness subsequently being machined to the final shape of the bulb. In practice, the extra thickness is usually obtained by adding an insert during the weaving of the fiber blank.

Nevertheless, such a method of fabricating a composite material blade with a bulb-shaped root presents numerous drawbacks. Specifically, making the insert and putting it into position during weaving of the fiber blank for the blade constitute operations that are very difficult. Also, that method requires the extra thickness of the blade root to be machined to its final shape, thereby having the consequence of spoiling the intrinsic properties of the composite material, in particular by cutting fibers in the bearing surfaces of the blade root. This causes degradation of the attachment of the blade in terms of its mechanical strength.

Also known, from document FR 2 941 487, is a solution for mounting a blade made of composite material on a rotor disk, in which the blade root is clamped between metal plates that are fastened by means of a welded peg. With that solution, the main force retaining the blade on the rotor disk is taken up by shear in the peg and by compression against the hole in the composite material. Nevertheless, the difference in expansion between the metal of the plates and the composite material of the root either gives rise to thermal shear stresses if the fastening is rigid, or else to uncertainty about the positioning of the bearing surfaces if the fastening is made with slack.

OBJECT AND SUMMARY OF THE INVENTION

A main object of the present invention is thus to propose a blade made of composite material that is attached to a rotor disk by a dovetail type connection without presenting the above-described drawbacks.

This object is achieved by a turbine engine blade made of composite material comprising fiber reinforcement obtained by three dimensionally weaving yarns and densified with a matrix, the blade comprising an airfoil and a blade root forming a single part, the blade root having two opposite lateral flanks that are substantially plane, and in which, in accordance with the invention the blade root is clamped between two independent pads made of composite material, which pads are fastened against the lateral flanks of the blade root so as to form a blade root that is bulb-shaped.

The blade root of the invention thus possesses three portions are made of composite material, namely the plate-shaped root (with its plane lateral flanks), and the two pads that reconstitute the profile of a bulb. Such a blade presents numerous advantages.

In terms of manufacture, the blade of the invention is of simplified design since the plate-shaped portion of the blade root is easier to obtain than is a bulb shape. This makes it possible to improve the quality of the blade root and to reduce the cost of fabricating it. Furthermore, cohesion between the various portions of the blade root is provided via interfaces that are plane, and that are easy to produce correctly (in terms of fabrication and of inspection).

In terms of the mechanical strength of the attachment of such a blade, the pads of the blade root may be fabricated out of composite material that is well adapted to the very high level of mechanical stress to which the root is subjected. In particular, it is preferable to use a material having the highest possible warp-to-weft ratio, or indeed a material that is unidirectional (i.e. 100% warp, with the warp direction extending in the longitudinal direction of the blade). The level of stress that can be accepted by such a material is considerably higher than that which can be accepted by a material obtained from a conventionally woven blade root. Furthermore, the pads may be made in such a manner as to obtain a face of "net" shape on the outside, i.e. a face without any cut fibers in the zone that is subjected to the greatest mechanical stress. Finally, since the various portions of the blade root are made of composite material, there is no differential expansion between the parts and thus no thermal shear stress at the interface between these portions.

Preferably, each pad comprises a substantially plane lateral flank for coming into contact with a lateral flank of the blade root, and an opposite lateral flank that presents a varying profile reproducing a blade root bearing surface. Under such circumstances, the pads may be obtained by molding a fiber preform and densifying the molded preform.

The pads may be fastened against the lateral flanks of the blade root by brazing, by co-densification, or by matrix deposition.

The blade root and the pads may be made of ceramic matrix composite material (CMC). Preferably, the pads are made from fiber reinforcement based on SiC fibers.

The invention also provides a turbine engine including a plurality of blades as defined above.

BRIEF DESCRIPTION OF THE DRAWING

Other characteristics and advantages of the present invention appear from the following description made with reference to the accompanying drawings, which show an implementation having no limiting character. In the figures:

FIG. 1 is a view showing how a turbine engine blade in accordance with the invention is assembled;

FIG. 2 is a perspective view of the FIG. 1 blade once assembled;

FIG. 3 is a profile view of the FIG. 2 blade; and

FIG. 4 is a section view of blade roots in accordance with the invention when mounted on a rotor disk.

DETAILED DESCRIPTION OF THE INVENTION

The invention is applicable to various turbine engine blades made of composite material, and in particular to compressor blades and to turbine blades of various spools of a gas turbine engine, for example low-pressure turbine blades such as those shown in FIGS. 1 to 4.

In known manner, the blade 10 as shown in these figures comprises an airfoil 12, a root 14 extended by a tang 16, and a platform 18 situated between the tang 16 and the airfoil 12. The blade could also have an outer platform (not shown) in the vicinity of its free end 20 (or tip).

The airfoil 12 of the blade presents a curved aerodynamic profile that extends (in a longitudinal direction) from the platform 18 to its tip 20. This profile is of varying thickness and is made up of a pressure side surface 12a and a suction side surface 12b that are connected together transversely by a leading edge 12c and by a trailing edge 12d.

The root 14 of the blade in this example is bulb-shaped and is for mounting in a slot formed in the periphery of a rotor disk by means of a dovetail type connection.

The blade 10 is made of composite material, preferably of ceramic matrix composite (CMC) material. By way of example, reference may be made to International patent application number WO 2010/061140, which describes an example of fabricating a turbine engine blade by making a fiber preform by three-dimensional weaving and by densifying the preform with a matrix.

More particularly, that method provides the making of a fiber blank as a single piece by three-dimensional weaving, shaping the fiber blank to obtain a fiber preform as a single piece having a first portion forming a preform for the airfoil and the root of the blade and at least one second portion forming a preform for an inner or outer platform of a blade, and then densifying the preform with a matrix. The method thus makes it possible to obtain a blade made of composite material having fiber reinforcement constituted by the preform and densified by the matrix, and forming a single piece with an incorporated (inner and/or outer) platform.

By virtue of its particular fabrication method, the blade root 14 presents the shape of a plate (i.e. of a rectangular parallelepiped) with two opposite lateral flanks 22 that are substantially plane and that are formed extending the pressure side and suction side surfaces 12a and 12b respectively of the airfoil 12.

According to the invention, the root 14 of the blade 10 is clamped between two independent pads 24 made of composite material, which pads are fastened against the lateral flanks 22 of the blade root so as to form a blade root that is bulb-shaped.

Each of the composite material pads 24 has a lateral flank 26 that is substantially plane (referred to below as the "plane lateral flank") for coming into plane contact against a lateral flank 22 of the blade root 14, and an opposite lateral flank 28 that presents a varying profile reproducing a blade root bearing surface (referred to below as the "profiled lateral flank").

The pads 24 are preferably obtained by three-dimensionally weaving a fiber blank, followed by molding the fiber blank in order to obtain a fiber preform for a place having the desired geometrical shapes, and then densifying the fiber preform with a matrix. In particular, the lateral face of the fiber blank corresponding to the profiled lateral flank of the pad is molded so as to give it the profile of a blade root bearing surface.

The fiber blank is preferably woven so as to present a warp-to-weft ratio that is as high as possible, or indeed solely with yarns in the warp direction (the warp direction corresponding to the longitudinal direction of the blade that is to be fabricated). As a result, the stress that such a material can accept is considerably greater than the stress of the material used for fabricating the blade root.

Likewise, because of the molding, the pads may be made in such a manner as to obtain a profiled lateral flank 28 of "net" shape, i.e. a face without any cut fibers. Since this is the zone of the root that is subjected to the highest levels of mechanical stress, such a net shape method greatly improves the mechanical strength of the blade root against the rotor disk.

For the composite material, it is preferable to select a ceramic matrix composite material (as for making the blade). Advantageously, the fiber reinforcement is based on silicon carbide fiber sold under the name "Hi-Nicalon® of type S" by the supplier Nippon Carbon Co., Ltd. Such fibers present the advantage of locally imparting excellent mechanical strength to the blade root.

Furthermore, it is possible to apply a specific surface coating to the profiled lateral flanks 28 of the pads 24 for the purpose of improving the friction behavior of the pads. This coating may be different from the coating optionally applied to the airfoil of the blade. For example, it is possible to apply coatings having a lubricating function such as graphite, CoCrAlYSi, or $MoS_2$.

The pads 24 are fastened to the lateral flanks 22 of the blade root 14 by any method known for fastening parts made of composite material. Thus, it is possible to have recourse to brazing, to co-densification, to matrix deposition, or to any other equivalent method. This fastening takes place between two surfaces that are substantially plane, thereby making it easier to perform.

It should be observed that it is possible to fasten additional elements to the blade root in the same manner as for fastening the pads that give the root its bulb shape. These elements can make it possible to provide the blade with sealing and/or anti-tilting functions, thereby simplifying the provision of the blade platform. Alternatively, these elements could be directly incorporated in the pads.

FIG. 4 shows blades 10 as described above that are mounted in slots 30 (or sockets) formed in the periphery of a rotor disk 32. Typically, such slots extend axially between the two lateral faces of the rotor disk, and each is of a shape complementary to the bulb shape of the blade roots.

In this figure, there can be seen the warp and the weft yarns of the weaving of the fiber blanks for the blades and for the pads. In particular, compared with weaving the blade root 14, it can be seen that the fiber blanks of the pads 24 are advantageously woven solely with yarns in the warp direction, thereby significantly increasing the stress that these pads can accept.

The invention claimed is:

1. A turbine engine blade comprising:
an airfoil and a blade root forming a single part,
the blade root including two opposite lateral flanks that are substantially plane, wherein the blade root is clamped between two independent pads made of composite material, which pads are fastened against the lateral flanks of the blade root to form a blade root that is bulb-shaped,
wherein the blade is made of composite material comprising fiber reinforcement obtained by three dimensionally weaving yarns and densified with a matrix.

2. A blade according to claim 1, wherein each pad comprises a substantially plane lateral flank for coming into contact with a lateral flank of the blade root, and an opposite lateral flank that presents a varying profile reproducing a blade root bearing surface.

3. A blade according to claim 2, wherein the pads are obtained by molding a fiber preform and densifying the molded preform.

4. A blade according to claim 1, wherein the pads are fastened against the lateral flanks of the blade root by brazing, by co-densification, or by matrix deposition.

5. A blade according to claim 1, further comprising a platform formed integrally with the airfoil and with the blade root.

6. A blade according to claim 1, wherein the blade root and the pads are made of ceramic matrix composite material.

7. A blade according to claim 6, wherein the pads are made from fiber reinforcement based on SiC fibers.

8. A blade according to claim 2, wherein the varying profile of the opposite lateral flank of each of the pads presents a face without any cut fibers.

9. A turbine engine comprising a plurality of blades according to claim 1.

* * * * *